G. A. PETERSON.
POSITIVE CLUTCH.
APPLICATION FILED OCT. 25, 1913.
1,139,443.
Patented May 11, 1915.
3 SHEETS—SHEET 1.
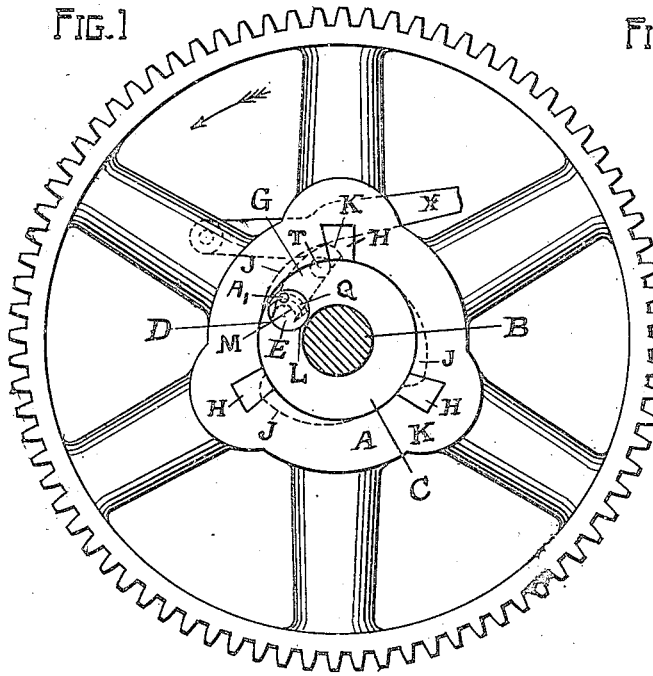
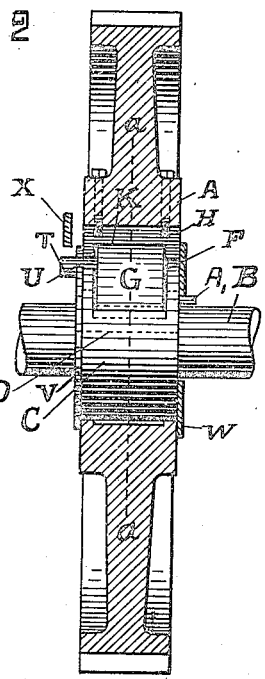
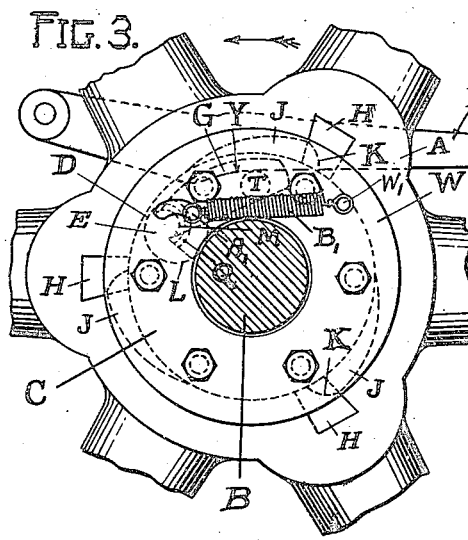
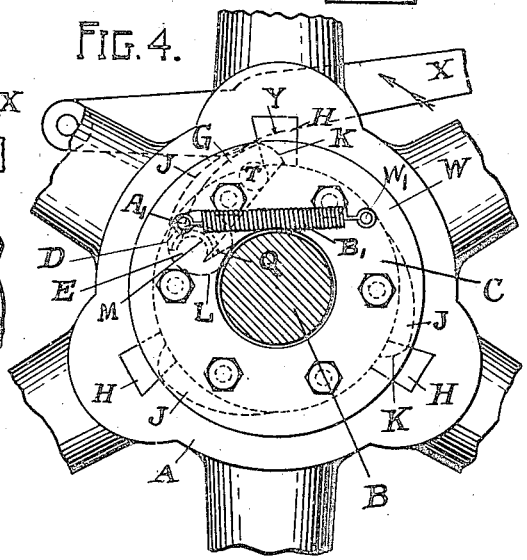
WITNESSES
Marcus S. Levé.
Fred Levé.
INVENTOR
George A. Peterson

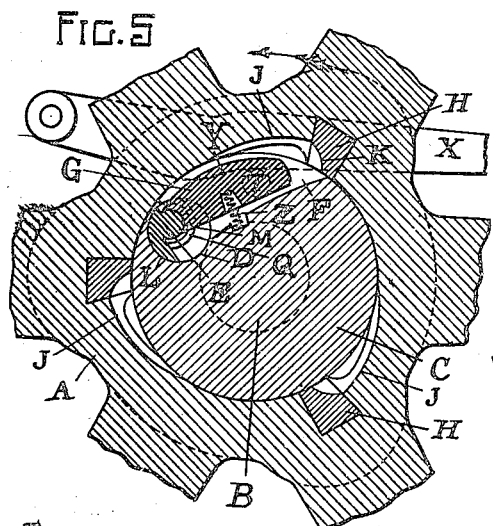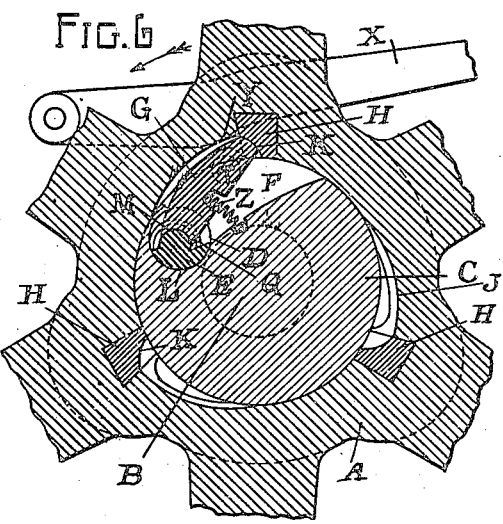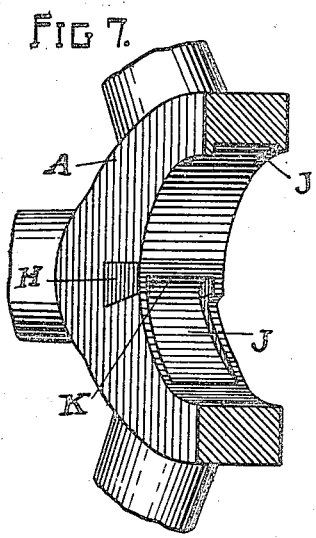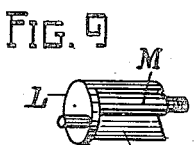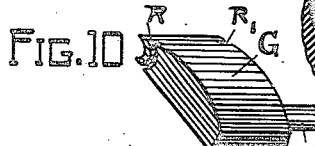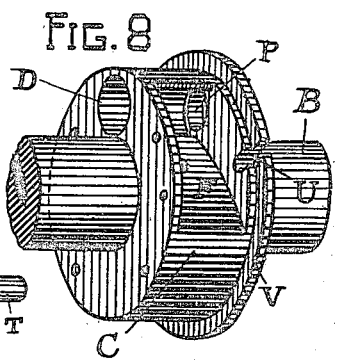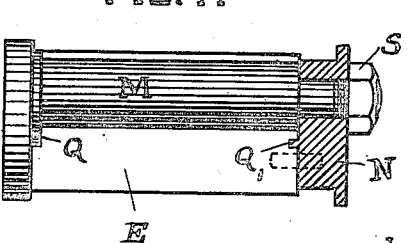

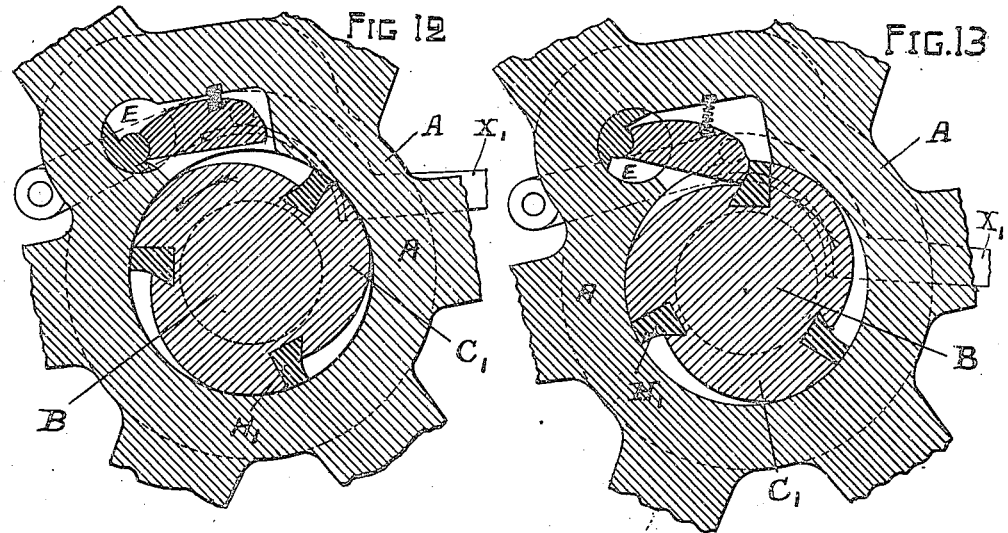
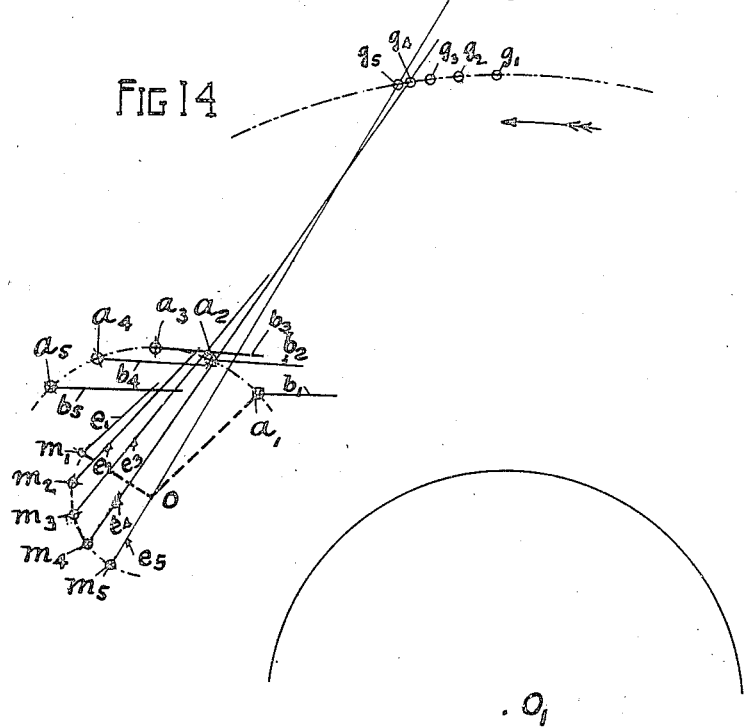

UNITED STATES PATENT OFFICE.

GEORGE A. PETERSON, OF OAKLAND, CALIFORNIA, ASSIGNOR TO UNIT BRICK AND STONE COMPANY, OF SAN FRANCISCO, CALIFORNIA, A CORPORATION OF CALIFORNIA.

POSITIVE CLUTCH.

1,139,443.  Specification of Letters Patent.  Patented May 11, 1915.

Application filed October 25, 1913. Serial No. 797,220.

*To all whom it may concern:*

Be it known that I, GEORGE A. PETERSON, a citizen of the United States, residing at Oakland, in the county of Alameda and State of California, have invented a Positive Clutch, of which the following is a specification.

My invention relates to the class of clutches, which are placed between the hub of a gear or a pulley and a shaft, for coupling them together at one time, so that they move in unison, and at another time for uncoupling them, to permit the one to continue its motion, while the other is brought to a rest.

The object of this invention is to provide a clutch, which will form a positive engagement between the connected parts, causing them to register one with the other, and at the same time have the facility of absorbing the shock due to the sudden starting of the machinery. I attain these ends by providing one of the parts to be coupled (preferably the driving part) with one or more notches and the other or driven part with a pawl, said pawl being yieldingly connected to said driven part in such a way, as to cause a spring or any other similar device to take up the shock, when the clutch is thrown in.

Referring now to the drawings hereunto annexed for a detailed description of my invention, Figure 1 is an elevation of a clutch as placed in the hub of a gear, the front plate or cover being removed, so as to clearly show the interior mechanism. Fig. 2 is an end elevation of the clutch with the gear shown in section. Fig. 3 is an enlarged side elevation, showing the positions of the working parts when the clutch is disengaged. Fig. 4 is an enlarged side elevation showing the positions of the parts when the clutch is in action. Fig. 5 is a section through line $a$—$a$ of Fig. 2 showing the mechanism in the position when the clutch is disengaged. Fig. 6 is a similar section showing the parts in the position when the clutch is in action. Fig. 7 is a perspective view of a part of the hub of a gear provided with a clutch of my invention, showing the steel abutment and the pocket for the clutch pawl. Fig. 8 is a perspective view of the clutch collar with part of the shaft, showing the pawl plug seat and the pawl pocket in the collar. Fig. 9 is a perspective view of the pawl plug body. Fig. 10 is a perspective view of the clutch pawl. Fig. 11 is an assembled drawing of the pawl plug and the loose disk. Fig. 12 is a cross section of a clutch as applied to a gear hub and a shaft the latter being the driving part and the former the driven, the mechanism here shown being in the position when the clutch is disengaged. Fig. 13 is a similar cross section showing the parts in their positions when the clutch is in action. Fig. 14 is a diagram showing the gradual application of force in starting the driven part.

In the drawings, Figs. 1 to 11 inclusive represent my invention as applied to a gear hub A and a shaft B, the hub being the driving part and the shaft the driven. A collar C is fastened on said shaft or forged integral with it, forming a bearing for said hub A. A cylindrical hole D is bored axially through the collar, constituting a seat for a pawl plug E. A pocket F is cut out in the collar C commencing at the pawl plug seat D and extending to the periphery. Said pocket is to contain the clutch pawl G. The hub A of the wheel is bound to fit the exterior of the collar C, and is provided with one or more abutting steel bars H which are fitted in doweled slots cut in the interior of the hub A. Pockets J are formed in the interior of the hub A in front of the steel abutting bars to permit the pawl G to engage said bars. The forward edge of the bars H are machined out to form abutting seats K.

The pawl plug E shown in detail in Figs. 9 and 11, has a cross section as shown in Figs. 5 and 6, consisting of two circular eccentric segments L and M, both convexed. The segment L is of a diameter to fit the bore of the pawl plug seat D, and made to rotate in it freely. The segment M is of a smaller diameter and constitutes the pivot for the pawl G. This cross section of the pawl plug E extends from one end to within a short distance of the other, where the metal is left to form a disk of circular shape, being the continuation of the segment L. This disk fits in the pawl plug seat D at the extreme end. It carries a pin $A_1$ for the attachment of a tension spring $B_1$ which holds it ordinarily in a position, as shown in Fig. 3. At the other end a loose disk N is attached to the pawl plug E by means of a bolt. The outer diameter of said disk N is somewhat smaller than the one at the other end, and is made to fit the reduced bore P of the pawl plug seat.

In assembling the clutch the pawl plug E is partly inserted in its seat D, the pivot end of the pawl is then put in the pocket F of the collar C and is placed on its pivot M; then the pawl plug E is moved inward to its limit, when the concentric tongue Q of the pawl plug E engages the concentric groove R of the pawl G. The disk N is next inserted in the reduced bore P, the concentric tongue $Q_1$ of the loose disk N engages the concentric groove $R_1$ of the pawl, and the disk is fastened to the pawl plug E by the nut S. The pawl is provided with a coiled spring Z, placed between it and the bottom of the pocket F, to force the end of the pawl outward. A pin T on the side of the pawl G passes outside the flange V through the slot U, and is used to disengage the pawl G, when the clutch is to be thrown out. After the pawl G is in its place the hub A of the wheel is placed over the collar C and moved forward until it bears against the flange V. The disk W is then fastened to the collar C to keep the hub A in place axially. The pawl plug E is then turned to the position shown in Fig. 3 and the tension spring $B_1$ is attached with one end on the pin $A_1$ of the pawl plug E and with the other to a pin $W_1$ made fast in the cover W. The object of this spring is to resist the rotation of the pawl plug due to the action of the pawl.

For the operation of the machine a lever X is fulcrumed at some convenient stationary point axially opposite the protruding end of the pin T, the bottom part of said lever being provided with a cam Y for the purpose of depressing the pin T and the pawl G, and thus disengage the clutch.

The operation of the clutch is as follows:—Beginning with the position of parts as shown in Fig. 5 the operating lever X is shown depressed, keeping the pin T and the pawl G down, the clutch is out of gear, the shaft B stationary, and the hub A is revolving in the direction shown by the arrow. To start the shaft B in motion the lever X is raised releasing the pressure from the pin T as shown in Fig. 6. The spring Z immediately forces the pawl G outward bringing the outer point in the path of the abutting steel bars H, which are moving with the hub A.

For a clearer description of the action of the abutting bars H upon the clutch in starting the shaft B from rest, I will refer to the diagram of Fig. 14, where $O_1$ represents the center of the shaft B. O is the center of the pawl plug E. $g_1$ $g_2$ $g_3$ $g_4$ and $g_5$ represent the successive positions of the free end of the pawl G in relation to the hub A, while the shaft B is being started: $m_1$ $m_2$ $m_3$ $m_4$ and $m_5$ are the positions of the center of the pawl pivot M as it is driven around the center of the pawl plug O; $a_1$ $a_2$ $a_3$ $a_4$ and $a_5$ are the several positions of the pin $A_1$ the lines $b_1$ $b_2$ $b_3$ $b_4$ and $b_5$ by their lengths and directions represent the magnitudes and directions of the resistance of the tension spring $B_1$ acting on the pin $A_1$ and the lines $e_1$ $e_2$ $e_3$ $e_4$ and $e_5$ represent the direction of the action of the pawl upon the pivot M and the magnitude of force required in each instance just sufficient to balance the force $b_1$ $b_2$ $b_3$ $b_4$ and $b_5$ of the spring $B_1$ on the pin $A_1$. It will be noticed, that as the center of the pawl pivot M is moving from the position $m_1$ to $m_5$, the distances of the lines of force $e_1$ $e_2$ $e_3$ $e_4$ and $e_5$ from the center O become smaller and smaller, diminishing in each instance the lever arm, on which said forces act; in consequence of which, the magnitudes of said forces (increasing in inverse proportion) will increase at a very rapid rate, and at $m_5$, the lever arm being O, the force required to balance the action of the spring becomes infinity. When the abutting bar H strikes the free end of the pawl G at the point $g_1$ it begins to exert a pressure on the pawl pivot M represented by the force $e_1$. This force tends to turn the shaft B around the center $O_1$ and the pawl plug E around the center O. Since the resistance offered by the shaft B exceeds that offered by the pawl plug E, the latter will turn until the pawl pivot M will come to some point $m_2$ from its former position at $m_1$; the force acting on it at this point represented by the line $e_2$ will be just sufficient to start moving the shaft B around its center $O_1$ but with a speed far less than that of the hub A. The abutting bar H, continuing its uniform motion, will continue to advance along the periphery of the collar C from the point $g_2$ to $g_3$. The pin M will then be at $m_3$ and the force acting to turn the shaft B will be represented by $e_3$. As this force considerably exceeds the force $e_2$, actually required to overcome the work done by the shaft, the difference will be spent in accelerating the velocity of the shaft and machinery, until at some point $g_4$ the hub A and the shaft B will run at the same rate of speed. The pressure on the pin M will then be represented by the line $e_4$, which is far above the required, and the velocity of the shaft B will slightly increase until the abutting bar H will again be back at the point $g_2$ in relation to the collar C, where the pressure on the pin M will again become $e_2$, which is the same as was required to start the shaft. At this position of the hub A relative to the shaft B the driving part and the driven will register under the same load.

For throwing the clutch out of gear the operating lever X is pressed down, bringing the cam portion Y within the path of the pin T, ready to engage it (when brought around by the revolving shaft) and to force it inward toward the center, so as to disengage the pawl G from the abutting bar H. The shaft B will then be brought to rest by the resistance of the machinery or a friction brake could be applied in the usual way and connected to the lever X in such a manner, as to apply the brake, when the clutch is thrown out, and release the same, when the clutch is in.

Figs. 12 and 13 represent a clutch of my invention, as applied in case the shaft is the driving part, and the hub the driven. In this case I place the pawl plug E in the hub A and the abutting bars $H_1$ in the collar $C_1$ of the shaft while the operating lever $X_1$ is made to act upward to disengage the clutch and downward to engage it, the principle of the action remaining the same.

Having thus fully described my invention what I claim as new therein and desire to secure by Letters Patent is—

1. In a positive clutch abutting surfaces fixed on a driving member, a pawl plug, adapted to turn around a center, on the other member, a spring for keeping said plug in a definite position, a pawl pivoted eccentrically to said plug at one end, the other free end being suited to engage said abutting surfaces on said driving member, the pivot in said plug being so located, as to cause the latter to turn against the action of said spring, when pressure is transmitted through said pawl, and means adapted to operate the free end of said pawl.

2. In a positive clutch a pawl plug, adapted to turn around a center, carried by one member, a spring for keeping said plug in a definite position, a pawl, pivoted eccentrically, carried by said plug and adapted to engage or disengage the other member, the pivot in said plug being so located, as to cause the latter to turn against the action of said spring, when pressure is transmitted through said pawl and means adapted to operate the free end of said pawl.

3. A positive clutch comprising a hub provided with one or more abutting surfaces, constituting one member, a collar fixed on a shaft, forming the other member, a pawl plug, adapted to turn around a center, fixed in said collar, a spring for holding said plug in a definite position, a pawl pivoted eccentrically to said plug, and adapted to engage or disengage said abutting surfaces of said hub, the pivot in the plug being so located, as to cause the latter to turn against the action of said spring when power is transmitted through said pawl, and means adapted to operate the free end of said pawl.

4. In a positive clutch a collar fixed on a shaft and provided with one or more abutting surfaces, forming one member, a hub of a wheel forming the other member, a pawl plug adapted to turn around a center, located in said hub, a spring for keeping said plug in a definite position, a pawl pivoted eccentrically to said plug, the free end being adapted to engage or disengage the said abutting surfaces in said collar, the pivot in the plug being so located, as to cause the latter to turn against the action of said spring, when power is transmitted through said pawl, and means to operate said pawl.

GEORGE A. PETERSON.

Witnesses:
MARCUS S. LEVE,
CHRIS SALOMONSON.